United States Patent [19]

Kim et al.

[11] 4,439,578

[45] Mar. 27, 1984

[54] USE OF LIQUID CRYSTAL POLYMER PARTICULATES HAVING A HIGH ASPECT RATIO IN POLYMERIC MOLDING RESINS TO SUPPRESS MELT DRIPPING

[75] Inventors: Sang N. Kim, Randolph; John R. Kastelic, Rockaway, both of N.J.

[73] Assignee: Celanese Corporation, New York, N.Y.

[21] Appl. No.: 319,523

[22] Filed: Nov. 9, 1981

[51] Int. Cl.³ .................... C08L 67/02; C08L 77/02; C08L 77/06

[52] U.S. Cl. .................................. 524/538; 524/539; 525/425; 525/432

[58] Field of Search ............. 525/425, 432, 420, 437; 264/176 F; 524/538, 539, 464, 409, 414

[56] References Cited

U.S. PATENT DOCUMENTS

| | | | |
|---|---|---|---|
| 3,005,795 | 10/1961 | Busse et al. | 260/455 |
| 3,294,871 | 12/1966 | Schmitt et al. | 260/900 |
| 3,671,487 | 6/1972 | Abolins | 106/15 FP |
| 3,751,396 | 8/1973 | Gall | 260/40 R |
| 3,809,729 | 5/1974 | Reinhard | 525/132 |
| 4,203,931 | 5/1980 | Lee, Jr. | 525/132 |
| 4,206,154 | 6/1980 | Lee, Jr. et al. | 525/132 |
| 4,332,714 | 6/1982 | Haaf et al. | 525/132 |

FOREIGN PATENT DOCUMENTS

| | | | |
|---|---|---|---|
| 52-74017 | 6/1977 | Japan . | |
| 946059 | 1/1964 | United Kingdom . | |
| 2008598A | 6/1979 | United Kingdom | 264/176 F |

*Primary Examiner*—Allan Lieberman
*Attorney, Agent, or Firm*—Burns, Doann, Swecker & Mathis

[57] ABSTRACT

Thermoplastic molding compositions are provided which have enhanced resistance to melt dripping during burning. Such molding compositions are modified by the inclusion of particulates of liquid crystal polymers which have a high aspect ratio which enhance the ability of the thermoplastic polymer to resist melt dripping.

28 Claims, No Drawings

USE OF LIQUID CRYSTAL POLYMER PARTICULATES HAVING A HIGH ASPECT RATIO IN POLYMERIC MOLDING RESINS TO SUPPRESS MELT DRIPPING

CROSS-REFERENCE TO RELATED APPLICATIONS

This application is related to U.S. patent applications (1) Ser. No. 319,522, filed Nov. 9, 1981, of Alan Buckley, Gordon W. Calundann and John R. Kastelic entitled "Thermotropic Liquid Crystal Polymer Pulp and Method of Production Thereof"; and (2) Ser. No. 319,521, filed Nov. 9, 1981, (now U.S. Pat. No. 4,395,307, granted July 26, 1983), of John R. Kastelic, Larry F. Charbonneau and Thomas P. Carter, Jr. entitled "Thermotropic Liquid Crystal Polymer Pulp and Method of Production Thereof Wherein Said Polymer Comprises Recurring Units Which Contain A 2,6-Dioxyanthraquinone Moiety".

BACKGROUND OF THE INVENTION

The present invention relates to thermoplastic molding compositions which possess desirable resistance to melt dripping.

Thermoplastic molding compositions which are comprised of a thermoplastic polymeric molding resin such as polyethylene terephthalate or polybutylene terephthalate have been known for many years. Such resins have the disadvantage, however, of having the tendency to drip when burning. Any attempt has been made to remedy this problem by the inclusion of asbestos fibers in the thermoplastic molding resin to increase the resistance of the resin to melt dripping. See, for example, commonly-assigned U.S. Pat. No. 3,751,396 (issued to Gall). However, the use of asbestos comprises a health hazard and it would be an advantage to find a non-toxic material which may be used as a substitute for asbestos. Chopped glass fiber has similarly been employed but requires high loading. Polytetrafluoroethylene resin has also been employed in various forms as a melt drip suppressant in molding compositions. See, for example, U.S. Pat. Nos. 3,671,487 (issued to Abolins), 3,294,871 (issued to Schmitt et al), 2,754,223 (issued to Caroselli) and British Pat. No. 946,059. However, the use of polytetrafluoroethylene is expensive and at times not easily incorporated into the molding resin and its use is accordingly commercially unattractive under certain circumstances. It is therefore desirable to provide an alternative method of enhancing the melt drip suppression characteristics of molding resins which is more commercially attractive.

OBJECTS AND SUMMARY OF THE INVENTION

It is therefore an object of the present invention to provide a melt drip suppressant which is relatively inexpensive and accordingly commercially attractive.

It is also an object of the present invention to provide a melt drip suppressent which can be readily admixed with a thermoplastic molding resin to enhance the ability of the resin to resist melt dripping.

It is further an object of the present invention to obviate the disadvantages of the prior art discussed above.

In accordance with the present invention, there is thus provided a thermoplastic molding composition possessing desirable resistance to melt dripping comprising a major amount of a thermoplastic polymeric molding resin and a minor amount of particulates comprised of a liquid crystal polymer which have an aspect ratio of at least about 10:1.

DETAILED DESCRIPTION OF THE INVENTION

It has been found that particulates of a high aspect ratio comprised of a liquid crystal polymer can be employed in thermoplastic molding compositions to enhance the ability of the compositions to resist melt dripping.

Liquid crystal polymers have been described by various terms, including "liquid crystalline," "liquid crystal" and "anisotropic." Briefly, the polymers of this class are thought to involve a parallel ordering of the molecular chains. The state wherein the molecules are so ordered is often referred to either as the liquid crystal state or the nematic phase of the liquid crystalline material. These polymers are prepared from monomers which are generally long, flat and fairly rigid along the long axis of the molecule and commonly have chain-extending linkages that are either coaxial or parallel.

Liquid crystal polymers may be either lyotropic or thermotropic. Lyotropic liquid crystal polymers are polymers which are liquid crystalline in solution. Thermotropic liquid crystal polymers readily form liquid crystals (i.e., exhibit anisotropic properties) in the melt phase. Such properties may be confirmed by conventional polarized light techniques whereby crossed polarizers are utilized. More specifically, the anisotropic phase may be confirmed by the use of a Leitz polarizing microscope at a magnification of 40× with the sample on a Leitz hot stage and under nitrogen atmosphere. The polymer is optically anisotropic; i.e., it transmits light when examined between crossed polarizers. Polarized light is transmitted when the sample is optically anisotropic even in the static state.

The liquid crystal polymers which are suitable for use in the process of the present invention may be either lyotropic or thermotropic liquid crystal polymers.

Lyotropic polymers include wholly aromatic polyamides, aromatic-aliphatic polyamides, aromatic polyamide-hydrazides, polybenzopbisoxazoles, and polybenzobisthiazoles. The aromatic polyamides are considered to be "wholly" aromatic in the sense that each moiety present in the polyamide contributes at least one aromatic ring to the polymer backbone.

Specific examples of wholly aromatic polyamides include polyparabenzamide and polyparaphenyleneterephthalamide. Polyparabenzamide and processes of preparing the same are disclosed in U.S. Pat. Nos. 3,109,836; 3,225,011; 3,541,056; 3,542,719; 3,547,895; 3,558,571; 3,575,933; 3,600,350; 3,671,542; 3,699,085; 3,753,957; and 4,025,494. Polyparaphenyleneterephthalamide, which is available commercially under the trademark Kevlar ®, and processes of preparing the same are disclosed in U.S. Pat. Nos. 3,006,899; 3,063,966; 3,094,511; 3,232,910; 3,414,645; 3,673,143; 3,748,299; 3,836,498; and 3,827,998, among others. All of the above-cited U.S. patents are herein incorporated by reference in their entirety. Other wholly aromatic polyamides are poly[2,7-(phenanthridone)terephthalamide], poly(paraphenylene-2,6-naphthalamide), poly[methyl-1,4-phenylene)terephthalamide], and poly[(chloro-1,4-phenylene)terephthalamide]. Additional specific examples of wholly aromatic polyamides are disclosed by P. W. Morgan in *Macromolecules*, Vol. 10, No. 6, pp. 1381–90 (1977), which is herein incorporated by reference in its entirety.

The above-cited reference also discloses examples of aromatic-aliphatic polyamides, such as poly(paraphenylene-1,4-trans-cyclohexyleneamide) and poly[(trans-1,4-cyclohexylene)terephthalamide].

Aromatic polyamide-hydrazides are disclosed by P. W. Morgan in *A.C.S. Polymer Preprints*, Vol. 18, No. 1, pp. 131–6 (1977), which is herein incorporated by reference in its entirety. Among such polymers can be listed poly(oxalylchloroterephthaloyldihydrazide) and poly(-paraphenylene-1,3,4-oxadiazole-coparaphenyleneterephthalamide).

An example of a polybenzobisoxazole is poly([benzo(1,2-d:5,4-d')bisoxazole-2,6-diyl]-1,4-phenylene); an example of a polybenzobisthiazole is poly([benzo(1,2-d:4,5-d')bisthiazole-2,6-diyl]-1,4-phenylene). These polymers are disclosed in *ACS Polymer Preprints*, Vol. 19, No. 2, pp. 1–6 (1978), which is herein incorporated by reference in its entirety.

The lyotropic polymers described above are liquid crystalline when dissolved in a compatible solvent such as selected amides and ureas, including N,N-dimethylacetamide, N,N-dimethylpropionamide, N,N-dimethylbutyramide, N,N-dimethylisobutyramide, N,N-dimethylmethoxyacetamide, N,N-diethylacetamide, N-methylpyrrolidone-2, N-methylpiperidone-2, N-methylcaprolactam, N-ethyl pyrrolidone-2, N-acetylpyrrolidone, N-acetylpiperidine, N,N'-dimethylethyleneurea, N,N'-dimethylpropyleneurea, hexamethylphosphoramide and N,N,N',N'-tetramethylurea; organophosphorus compounds, including N,N-dimethyldimethylphosphinamide, N,N,N',N'-tetramethylmethylphosphondiamide, N,N,N',N'-tetramethylethylphosphondiamide, N,N,N',N'-tetraethylmethylphosphondiamide, triethylphosphine oxide, triisopropylphosphine oxide, 1,3-dimethyl-1-phospha-3-cyclopentene-1-oxide, 1-ethyl-3-methyl-1-phospha-3-cyclopentene-1-oxide, and 1-methyl-1-phosphacyclopentane-1-oxide; concentrated sulfuric acid whose concentration is greater than about 90 percent by weight, usually approximately 98–100 percent by weight $H_2SO_4$ or oleum (i.e., concentrated sulfuric acid containing up to 20 percent or higher of free $SO_3$) which may contain additives (e.g., $NaH_2PO_4$, $Na_2SO_4$, or potassium acetate) which may be present in the amount of 2–3 percent by weight of the total solution; hydrofluoric acid, used alone or in combination with additives such as water (1–2 percent by weight, of the total solution), NaF or KF (1–2 percent by weight of the total solution), an inert chlorinated hydrocarbon (e.g., $CH_2Cl_2$) or mixtures thereof (in an amount up to 5 percent by weight of the total solution); and chloro-, fluoro- or methane-sulfonic acids used alone or in combination with additives such as lithium chloride (up to about 2.5 percent by weight).

Mixtures of two or more of the above solvents may be used in suitable combinations, e.g., any of the amides and ureas; hydrofluoric acid and fluoro-sulfonic acid; methane-sulfonic acid and sulfuric acid; oleum and chloro-, fluoro- or methane-sulfonic acid; and the like.

The lyotropic polymer may be dissolved in the solvent in a concentration of approximately 1 to 30 percent by weight.

The use of additives is preferred in many of the solutions. It is believed that particular additives aid the solvation of the polyamide in the solvent. For the amide and urea media, it is highly desirable that at least about 2.0 weight percent of lithium chloride and/or calcium chloride be added to provide a reasonably concentrated solution from particular isolated polymers, e.g., polyparabenzamide. In the preparation of an amide or urea solution, the salt may be conveniently added to the polymer and/or solvent. Salt in excess of about 20 weight percent is generally neither necessary nor desired; less than about 15 weight percent is preferred, about 4 to 8 weight percent being most preferred.

Those thermotropic liquid crystal polymers suitable for use in the present invention include but are not limited to wholly aromatic polyesters, aromatic-aliphatic polyesters, aromatic polyazomethines, wholly and non-wholly aromatic poly(ester-amide)s and aromatic polyester-carbonates.

The wholly aromatic thermotropic liquid crystal polymers are comprised of moieties which contribute at least one aromatic ring to the polymer backbone and which enable the polymer to exhibit anisotropic properties in the melt phase. Such moieties include but are not limited to aromatic diols, aromatic amines, aromatic diacids and aromatic hydroxy acids. Moieties which may be present in the thermotropic liquid crystal polymers employed in the present invention (wholly aromatic or non-wholly aromatic) include but are not limited to the following:

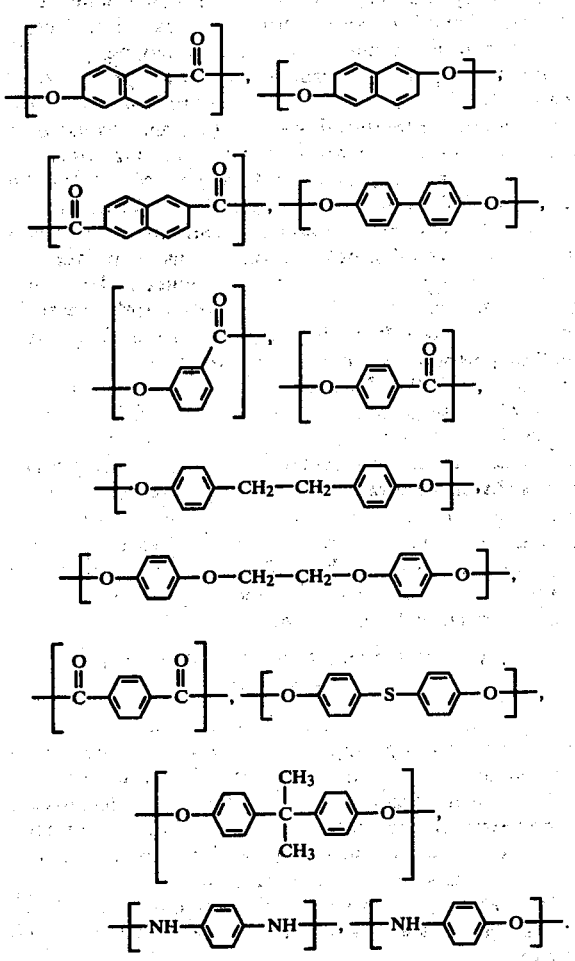

Specific examples of suitable aromatic-aliphatic polyesters are copolymers of polyethylene terephthalate and hydroxybenzoic acid are disclosed in *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1-4. A further disclosure of such copolymers can be found in "Liquid Crystal Polymers: I. Preparation and Properties of p-Hydroxybenzoic Acid Copolymers," *Journal of Polymer Science, Polymer Chemistry Edition*, Vol. 14, pp. 2043-58 (1976), by W. J. Jackson, Jr. and H. F. Kuhfuss. The above-cited references are herein incorporated by reference in their entirety.

Aromatic polyazomethines and processes of preparing the same are disclosed in the U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly(nitrilo-2-methyl-1,4-phenyl-enenitriloethylidyne-1,4-phenyleneethylidyne); poly(nitrolo-2-methyl-1,4-phenylene-nitrilomethylidyne-1,4-phenylene-methylidyne); and poly(nitrilo-2-chloro-1,4-phenylenenitrilomethylidyne-1,4-phenylenemethylidyne).

Aromatic polyester-carbonates are disclosed in U.S. Pat. No. 4,107,143, which is herein incorporated by reference in its entirety. Examples of such polymers include those consisting essentially of hydroxybenzoic acid units, hydroquinone units, carbonate units, and aromatic carboxylic acid units.

The liquid crystal polymers which are preferred for use in the present invention include thermotropic wholly aromatic polyesters. Recent publications disclosing such polyesters include (a) Belgian Pat. Nos. 828,935 and 828,936, (b) Dutch Pat. No. 7505551, (c) West German Pat. Nos. 2,520,819, 2,520,820, and 2,722,120, (d) Japanese Pat. Nos. 43-223, 2132-116, 3017-692, and 3021-293, (e) U.S. Pat. Nos. 3,991,013; 3,991,014; 4,057,597; 4,066,620; 4,075,262; 4,118,372; 4,146,702; 4,153,779; 4,156,070; 4,159,365; 4,169,933; 4,181,792; 4,188,476; 4,201,856; 4,226,970; 4,232,143; 4,232,144; 4,238,600; 4,245,082; 4,267,304; 4,242,496; and 4,269,965; and (f) U.K. Application No. 2,002,404.

Wholly aromatic polymers which are preferred for use in the present invention include wholly aromatic polyesters and poly(ester-amide)s which are disclosed in commonly-assigned U.S. Pat. Nos. 4,067,852; 4,083,829; 4,130,545; 4,161,470; 4,184,996; 4,219,461; 4,238,599; 4,256,624; 4,279,803; 4,299,756; 4,330,457; and 4,337,191. The disclosures of all of the above-identified commonly-assigned U.S. patents are herein incorporated by reference in their entirety. The wholly aromatic polymers disclosed therein typically are capable of forming an anisotropic melt phase at a temperature below approximately 400° C., and preferably below approximately 350° C.

The wholly aromatic polymers, including wholly aromatic polyesters and poly(ester-amide)s, which are suitable for use in the present invention may be formed by a variety of ester-forming techniques whereby organic monomer compounds possessing functional groups which, upon condensation, form the requisite recurring moieties are reacted. For instance, the functional groups of the organic monomer compounds may be carboxylic acid groups, hydroxyl groups, ester groups, acyloxy groups, acid halides, amine groups, etc. The organic monomer compounds may be reacted in the absence of a heat exchange fluid via a melt acidolysis procedure. They, accordingly, may be heated initially to form a melt solution of the reactants with the reaction continuing as the polymer particles are suspended therein. A vacuum may be applied to facilitate removal of volatiles formed during the final stage of the condensation (e.g., acetic acid or water).

Commonly-assigned U.S. Pat. No. 4,083,829, entitled "Melt Processable Thermotropic Wholly aromatic Polyester," describes a slurry polymerization process which may be employed to form the wholly aromatic polyesters which are preferred for use in the present invention. According to such a process, the solid product is suspended in a heat exchange medium. The disclosure of this patent has previously been incorporated herein by reference in its entirety.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polymers suitable for use in the present invention tend to be substantially insoluble in common solvents and accordingly are not susceptible to solution processing. As discussed previously, they can be readily processed by common melt processing techniques. Most suitable wholly aromatic polymers are soluble in pentafluorophenol to a limited degree.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic poly(ester-amide)s which are preferred commonly exhibit a molecular weight of about 5000 to 50,000 and preferably about 10,000 to 30,000; e.g., 15,000 to 17,000. Such molecular weight may be determined by gel permeation chromatography as well as by standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters and poly(esteramide)s additionally commonly exhibit an inherent viscosity (i.e., I.V.) of at least approximately 2.0 dl./g., e.g., approximately 2.0 to 10.0 dl./g., when dissolved in a concentration of 0.1 percent by weight in pentafluorophenol at 60° C.

Especially preferred wholly aromatic polymers are those which are disclosed in above-noted U.S. Pat. Nos. 4,161,470, 4,184,996, 4,238,599 and 4,219,461.

For the purposes of the present invention, the aromatic rings which are included in the polymer backbones of the polymer components employed in the present invention may include substitution of at least some of the hydrogen atoms present upon an aromatic ring. Such substituents include alkyl groups of up to four carbon atoms; alkoxy groups having up to four carbon atoms; halogens; and additional aromatic rings, such as phenyl or substituted phenyl. Preferred halogens include fluorine, chlorine and bromine. Although bromine atoms tend to be released from organic compounds at high temperatures, bromine is more stable on aromatic rings than on aliphatic chains, and therefore is suitable for inclusion as a possible substituent on the aromatic rings.

The wholly aromatic polyester which is disclosed in U.S. Pat. No. 4,161,470 is a melt processable wholly aromatic polyester capable of forming an anisotropic melt phase at a temperature below approximately 350° C. The polyester consists essentially of the recurring moieties I and II wherein:

I is

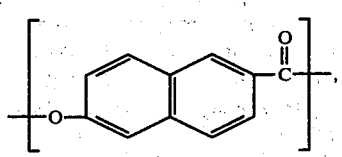

and
II is

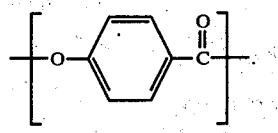

The polyester comprises approximately 10 to 90 mole percent of moiety I, and approximately 10 to 90 mole percent of moiety II. In a preferred embodiment, moiety II is present in a concentration of approximately 65 to 90 mole percent, and more preferably in a concentration of approximately 70 to 90 mole percent, e.g., approximately 90 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

The wholly aromatic polyester which is disclosed in U.S. Pat. No. 4,184,996 is a melt processable wholly aromatic polyester capable of forming an anisotropic melt phase at a temperature below approximately 325° C. The polyester consists essentially of the recurring moieties I, II, and III wherein:

I is

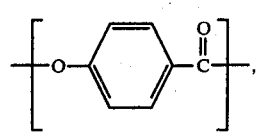

II is

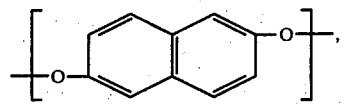

and
III is

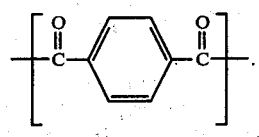

The polyester comprises approximately 30 to 70 mole percent of moiety I. The polyester preferably comprises approximately 40 to 60 mole percent of moiety I, approximately 20 to 30 mole percent of moiety II, and approximately 20 to 30 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

The wholly aromatic polyester which is disclosed in U.S. Pat. No. 4,238,599 is a melt processable polyester capable of forming an anisotropic melt phrase at a temperature no higher than approximately 320° C. consisting essentially of the recurring moieties I, II, III and IV wherein:

I is

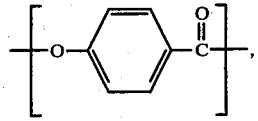

II is

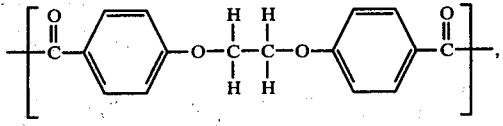

III is

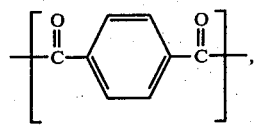

and

IV is

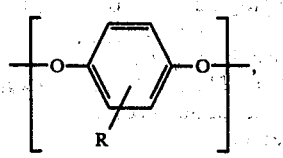

where R is methyl, chloro, bromo, or mixtures thereof, and is substituted for a hydrogen atom present upon the aromatic ring, and wherein said polyester comprises approximately 20 to 60 mole percent of moiety I, approximately 5 to 18 mole percent of moiety II, approximately 5 to 35 mole percent of moiety III, and approximately 20 to 40 mole percent of moiety IV. The polyester preferably comprises approximately 35 to 45 mole percent of moiety I, approximately 10 to 15 mole percent of moiety II, approximately 15 to 25 mole percent of moiety III, and approximately 25 to 35 mole percent of moiety IV, with the proviso that the total molar concentration of moieties II and III is substantially identical to that of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof. This wholly aromatic polyester commonly exhibits an inherent viscosity of at least 2.0 dl./g., e.g., 2.0 to 10.0 dl./g., when dissolved in a concentration of 0.1 weight/volume percent in pentafluorphenol at 60° C.

The polyester disclosed in U.S. Pat. No. 4,219,461 is a melt processable wholly aromatic polyester which is capable of forming an anisotropic melt phase at a temperature below approximately 320° C. The polyester consists essentially of the recurring moieties I, II, III, and IV wherein:

I is

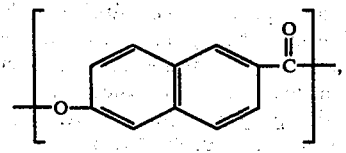

II is

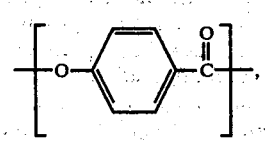

III is a dioxy aryl moiety of the formula —O—Ar—O— wherein Ar is a divalent radical comprising at least one aromatic ring, and IV is a dicarboxy aryl moiety of the formula

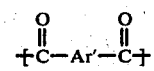

wherein Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV. The polyester preferably comprises approximately 20 to 30 (e.g., approximately 25) mole percent of moiety I, approximately 25 to 40 (e.g., approximately 35) mole percent of moiety II, approximately 15 to 25 (e.g. approximately 20) mole percent of moiety III, and approximately 15 to 25 (e.g., approximately 20) mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Moieties III and IV are preferably symmetrical in the sense that the divalent bonds which join these moieties to other moieties in the main polymer chain are symmetrically disposed on one or more aromatic rings (e.g., are para to each other or diagonally disposed when present on a naphthalene ring). However, non-symmetrical moieties, such as those derived from resorcinol and isophthalic acid, may also be used.

Preferred moieties III and IV are set forth in above-noted U.S. Pat. No. 4,219,461. The preferred dioxy aryl moiety III is:

and the preferred dicarboxy aryl moiety IV is:

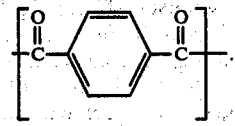

The object of the present invention is to incorporate particulates of a liquid crystal polymer in an amount and having the requisite physical characteristics sufficient to render a thermoplastic molding composition non-burning, self-extinguishing and/or non-dripping within the meaning of ASTM Test D-635 and Underwriter's Laboratories Test Method 94V-O, each specifically incorporated herein by reference.

Briefly, materials which are classified 94V-O are required to (1) not burn with flaming combustion for more than 10 seconds after application of the test flame; (2) not have a total flaming combustion time exceeding 50 seconds for the 10 flame applications for each set of five specimens; (3) not burn with flaming or glowing combustion up to the holding clamp employed; (4) not drip flaming particles that ignite dry absorbent surgical cotton located 12 inches below the test specimen; and (5) not have glowing combustion which persists beyond 30 seconds after the second removal of the test flame.

For the purposes of the present invention, the liquid crystal polymers are employed in the form of particulates of high aspect ratios. Suitable aspect ratios (i.e., ratio of length of diameter or equivalent diameter to thickness ratio for platelets) are in excess of about 10:1. It is preferred that the particulates have an aspect ratio of at least 25:1, and most preferably at least about 50:1.

It is preferred that the polymers be employed in the form of particulates having a maximum length ranging from about 30 microns to about 0.5 inch, and a maximum diameter ranging from about sub-micron to about 30 microns.

The liquid crystal polymer particulates may be added to thermoplastic molding compositions in sufficient amounts to enhance the ability of the composition to resist melt dripping. Such amounts generally range from about 1 to about 10 percent by weight based on the weight of the composition to which the particulates are added. Subsequent to the addition of the particulates to the molding resin, the molding composition comprises a major portion [i.e., generally greater than about 90 percent by weight (e.g. about 90 to about 99 percent by weight)] of the molding resin and a minor portion [i.e., generally less than about 10 percent by weight of the melt drip suppressant (e.g. about 1 to about 10 percent by weight)].

The particulates can be compounded into the molding resin by any suitable means. For example, the particulates can be premixed with the resin together with other additives such as flame retardents, reinforcing agents, etc. with the admixture then being melt extruded.

The particulates which can be employed in the present invention may be in several forms such as fibrils, chopped fibers of fine denier, chopped microfibers, fibrides, platelets, fibrillated fiber, etc. Chopped fibers are desirably of a diameter ranging from about submicron to about 30 microns. It is preferred that such particulates be employed in the form of fibrils or fibrillated fiber.

The fibrils may be produced by several methods including mechanically masticating shaped articles including as-spun thermotropic liquid crystal polymer fibers. Since the as-spun fibers are highly oriented along their longitudinal axis, the fibers are able to withstand much less stress along the transverse axis as opposed to along the longitudinal axis. Accordingly, the fibers break up lengthwise into much narrower fibrils as they are masticated to form a pulp. Such shaped articles are preferably masticated while in the form of an aqueous slurry wherein the articles comprise from about 0.5 to about 15 weight percent of the slurry. The term "masticating" as used herein is intended to include various mechanical processes such as grinding whereby the shaped article is subjected to grinding and/or shearing forces of sufficient magnitude to break up the shaped article into fibrils.

Such processes include but are not limited to the use of fluid or air turbulence (i.e., air fibrillation), use of high shear (i.e., as in a pulp refiner and open disk emulsifier), repeated chopping in conjunction with fluid shear (e.g., as in a Waring blender), and crushing in conjunction with mechanical shear (e.g., as in a Jordan "beater"). The mastication step may involve a series of techniques rather than a single operation.

The fibrils which are produced commonly exhibit a ratio of length to diameter which is much greater than that exhibited by the fibers. For example, the length to diameter ratio exhibited by the fibers generally ranges from about 10:1 to about 50:1, while the corresponding ratio for the fibrils ranges from about 20:1 to about 200:1. The fibrils preferably exhibit a diameter of about 0.5 to about 5 microns and a length of about 0.1 to about 2 millimeters. The fibers generally exhibit a denier of about 1 to 10.

While it is preferred to employ fibers in the mastication process, it is also possible to use articles of other shapes and configurations. For example, the polymer may also be in the form of pellets or sheets, etc. The term shaped article as used herein is intended to include particles, pellets, filaments, staple fibers, films, sheets and other extruded, molded, cast or otherwise formed shaped articles.

It should be noted, however, that the more highly oriented is the polymer in the article, the higher the aspect ratio of the fibrils which are formed will be. It is therefore preferable to employ articles in the mastication process which are highly oriented as a result of being formed (e.g., spray spun fibers) so as to provide fibrils having a high aspect ratio.

Further discussions regarding the production of fibrils of thermotropic liquid crystal polymers exists in copending U.S. patent applications (1) Ser. No. 319,522, filed Nov. 9, 1981, of Alan Buckley, Gordon W. Calundann and John R. Kastelic entitled "Thermotropic Liquid Crystal Polymer Pulp and Method of Production Thereof"; and (2) Ser. No. 319,522, filed Nov. 9, 1981, (now U.S. Pat. No. 4,395,307) of John R. Kastelic, Larry F. Charbonneau and Thomas P. Carter, Jr. entitled "thermotropic Liquid Crystal Polymer Pulp and Method of Production Thereof Wherein Said Polymer Comprises Recurring Units Which Contain A 2,6-Dioxyanthraquinone Moiety", wherein incorporated by reference.

The fibrils which are added to the molding composition are necessarily comprised of a liquid crystal polymer which either will not melt or which will melt at a temperature in excess of the melting temperature of the polymeric molding resin of which the molding composition is comprised. That is, a temperature-resistant network of fibrils is preferably provided within the molding resin which acts to hold the resin together as a coherent mass and thus inhibit melt flow.

Most preferably, the fibrils are comprised of a liquid crystal polymer which will not melt but merely degrades into a graphitic carbon fibril which retains its configuration upon being heated to a sufficiently high temperature. In such an instance, the fibril will continue to serve as a melt drip suppressant since it retains its shape even though the chemical characteristics of the fibril may have changed. An exemplary liquid crystal polymer which exhibits such non-melting properties includes but is not limited to polyparaphenyleneterephthalamide which is commercially available under the trademark Kevlar$^R$. Fibrils comprised of such a polymer carbonize upon heating to above 500° C. while retaining their configuration.

On the other hand, even if the liquid crystal polymer does not degrade into graphitic carbon but will instead melt at a sufficiently high temperature, fibrils comprised of such polymers can still be employed as melt drip suppressants provided that the melting temperature of such polymers is sufficiently high and exceeds the melting temperature of the polymeric molding resin.

Preferably, the melting temperature of the liquid crystal polymer exceeds the melting temperature of the polymeric molding resin by from about 100 to about 300° C. It is also preferable that the melting temperature of such polymers be in excess of about 200° C. and most preferably be in excess of about 400° C. Of course, the thermal stability characteristics of the liquid crystal polymer which are required can be ascertained by a review of the thermal environment to which the polymeric molding resin is to be subjected.

If the fibrils are comprised of a liquid crystal polymer which does not exhibit a melting temperature of sufficient magnitude, the fibrils can be subjected to a heat treatment to increase the melting temperature of the polymer. The heat treatment improves the properties of the fibrils by increasing the molecular weight of the liquid crystalline polymer which comprises the fibrils and increasing the degree of crystallinity thereof while also increasing the melting temperature of the polymer.

The fibrils may be thermally treated in an inert atmosphere (e.g., nitrogen, carbon dioxide, argon, helium) or alternatively, in a flowing oxygen-containing atmosphere (e.g., air). The use of a non-oxidizing substantially moisture-free atmosphere is preferred to avoid the possibility of thermal degradation. For instance, the fibrils may be brought to a temperature approximately 10 to 30 centigrade degrees below the melting temperature of the liquid crystal polymer, at which temperature the fibrils remain a solid object. It is preferable for the temperature of the heat treatment to be as high as possible without equaling or exceeding the melting temperature of the polymer. It is most preferable to gradually increase the temperature of heat treatment in accordance with the increase of the melting temperature of the polymer during heat treatment.

The duration of the heat treatment will commonly range from a few minutes to a number of days, e.g., from 0.5 to 200 hours, or more. Preferably, the heat treatment is conducted for a time of 1 to 48 hours and typically from about 5 to 30 hours.

Generally, the duration of heat treatment varies depending upon the heat treatment temperature; that is, a shorter treatment time is required as a higher treatment temperature is used. Thus, the duration of the heat treatment can be shortened for higher melting polymers, since higher heat treatment temperatures can be employed without melting the polymer.

The heat treatment will normally be conducted under conditions sufficient to increase the melting temperature of the polymer the desired extent. Preferably, the melting temperature of the liquid crystal polymer is increased in excess of about 10 centigrade degrees as a result of the heat treatment and most preferably in excess of 50 centigrade degrees. The amount of increase which is obtained is dependent upon the temperature used in the heat treatment, with higher heat treatment temperatures giving greater increases.

It should be noted at this time that reference herein to a temperature below which a specific polymer may exhibit anisotropic properties in the melt phase is intended to refer to the temperature below which the polymer exhibits such properties prior to any heat treatment thereof.

The chemical resistance of thermotropic liquid crystal polymers also increases with heat treatment and the solubility into pentafluorophenol, one of the rare solvents for thermotropic liquid crystal polymers, continuously decreases with increasing heat treatment time and eventually the material will not dissolve even minimally (such as in amounts of 0.1 percent by weight). Accordingly, reference herein to the solvation characteristics of such polymers which may be employed is intended to describe such characteristics prior to heat treatment thereof.

The thermoplastic molding composition to which the fibrils are added is comprised of a thermoplastic polymeric resin generally employed in molding compositions. Such polymeric resins include but are not limited to thermoplastic polyesters such as poly(ethylene) terephthalate) and poly(butylene terephthalate). Other thermoplastic polymeric resins which are suitable for use in molding compositions such as Nylon 6 and Nylon 6,6 are well known to those skilled in the art and will not be discussed in detail herein.

The polymeric molding resin may also contain various fillers (mineral filler and other additives such as flame-retardants) and reinforcing fibers (e.g., glass fibers). Suitable fillers and fibers are disclosed in U.S. Pat. No. 3,751,396, herein incorporated by reference.

The use of flame-retardants in polymeric molding resins is known to those skilled in the art. See, for example, U.S. Pat. No. 3,671,487, herein incorporated by reference, for a more detailed discussion of useful flame retardants. Preferred flame retardants include halogenated organic compounds wherein the halogen is bromine or chlorine. Antimony-, nitrogen- and phosphorous-containing compounds are also useful as flame retardants.

The invention is additionally illustrated in connection with the following Example which is to be considered as illustrative of the present invention. It should be understood, however, that the invention is not limited to the specific details of the Example.

EXAMPLE

A thermoplastic molding composition formed in accordance with the present invention is comprised of the molding resin poly(butylene terephthalate) and 5 percent by weight of a pulp of the lyotropic liquid crystal polymer polyparaphenylene terephthalamide. The aspect ratio of the particulates in the pulp ranges from about 10:1 to about 200:1. The molding composition also contains as flame retardants 10 percent by weight of decabromo diphenyl ether and 4 percent by weight of $Sb_2O_3$. The molding composition is formed by dry-mixing the various components with ground poly(butylene terephthalate) resin and compression molding the admixture into placques of 1/32 inch thickness. The plaques are tested according to standard test method 94V-O and meet all criteria with respect to the standard vertical burn tests with bottom ignition.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A thermoplastic molding composition possessing desirable resistance to melt dripping comprising a major amount of a thermoplastic polymeric molding resin selected from the group consisting of thermoplastic polyesters and thermoplastic polyamides and a minor amount of particulates comprised of a liquid crystal polymer having an aspect ratio of at least about 10:1 and a length ranging from about 30 microns to about 0.5 inch, the melting temperature of said thermoplastic polymeric molding resin being lower than the temperature at which said liquid crystal polymer will melt or degrade and the temperature at which said polymer will melt or degrade being of sufficient magnitude and said particulates being present in an amount sufficient to enhance the ability of said molding resin to resist melt dripping.

2. The molding composition of claim 1 wherein said liquid crystal polymer is a lyotropic liquid crystal polymer.

3. The molding composition of claim 2 wherein said liquid crystal polymer is polyparaphenyleneterephthalamide.

4. The molding composition of claim 1 wherein said liquid crystal polymer is a thermotropic liquid crystal polymer.

5. The molding composition of claim 4 wherein said thermotropic liquid crystal polymer has a melting temperature in excess of about 200° C.

6. The molding composition of claim 4 wherein said liquid crystal polymer is a wholly aromatic polymer.

7. The molding composition of claim 6 wherein said liquid crystal polymer is a wholly aromatic polyester.

8. The molding composition of claim 1 comprising at least about 90 percent by weight of said thermoplastic molding resin.

9. The molding composition of claim 1 comprising from about 90 to about 99 percent by weight of said thermoplastic molding resin.

10. The molding composition of claim 1 comprising from about 1 to about 10 percent by weight of said particulates.

11. The molding composition of claim 1 wherein said thermoplastic polymeric resin comprises poly(ethylene terephthalate), poly(Butylene terephthalate) or nylon 6,6.

12. The molding composition of claim 1 wherein said thermoplastic polymeric resin comprises blends of resins of claim 11.

13. The molding composition of claim 1 further comprising a flame retardant.

14. The molding composition of claim 13 wherein said flame retardant comprises a halogenated organic compound.

15. The molding composition of claim 1 wherein said particulates exhibit a ratio of length to diameter of from about 10:1 to about 50:1.

16. The molding composition of claim 1 wherein said particulates comprise fibrils.

17. The molding composition of claim 1 further comprising reinforcing fibers.

18. The molding composition of claim 17 wherein said fibers comprise glass fibers.

19. The molding composition of claim 4 wherein said thermotropic liquid crystal polymer has been subjected to a heat treatment prior to incorporation in said molding resin composition at a temperature and for a period of time sufficient to increase the melting temperature thereof.

20. The molding composition of claim 19 wherein said polymer has been subjected to a heat treatment for a period of time and at a temperature sufficient to increase the melting temperature of the polymer in excess of about 10 centigrade degrees.

21. The molding composition of claim 19 wherein said melting temperature is increased in excess of 50 centigrade degrees.

22. The molding composition of claim 19 wherein said heat treatment temperature ranges from about 10 to about 30 centigrade degrees below the melting temperature of the polymer.

23. The molding composition of claim 19 wherein said period of time ranges from about 0.5 to about 200 hours.

24. The molding composition of claim 19 wherein said period of time ranges from about 1 to about 48 hours.

25. The molding composition of claim 25 wherein said period of time ranges from about 5 to about 30 hours.

26. The molding composition of claim 19 wherein said heat treatment occurs in a non-oxidizing atmosphere.

27. The molding composition of claim 26 wherein said atmosphere is substantially moisture-free.

28. The molding composition of claim 26 wherein said heat treatment occurs in a nitrogen atmosphere.

* * * * *